US008213163B2

(12) United States Patent
Wu et al.

(10) Patent No.: US 8,213,163 B2
(45) Date of Patent: *Jul. 3, 2012

(54) TILTING PORTABLE ELECTRONIC DEVICE

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 76 days.

This patent is subject to a terminal disclaimer.

(21) Appl. No.: 12/825,462

(22) Filed: Jun. 29, 2010

(65) Prior Publication Data
US 2011/0157785 A1    Jun. 30, 2011

(30) Foreign Application Priority Data
Dec. 31, 2009    (CN) ................. 2009 1 0312950

(51) Int. Cl.
*G06F 1/16* (2006.01)
(52) U.S. Cl. ............. 361/679.01; 312/309; 425/450.1; 455/115.3
(58) Field of Classification Search .......... 361/679.01, 361/679.55, 679.09, 679.21, 679.27, 679.58, 361/679.3, 695, 728; 312/265.4, 212, 309, 223.1; 425/138, 450.1; 345/173, 174, 177, 157; 455/575.4, 572, 575.8, 115.3
See application file for complete search history.

(56) References Cited

U.S. PATENT DOCUMENTS

| 6,877,425 B2* | 4/2005 | Lynton .................. 101/333 |
| 2011/0156559 A1* | 6/2011 | Wu et al. .................. 312/309 |
| 2011/0157784 A1* | 6/2011 | Wu et al. .................. 361/679.01 |

* cited by examiner

*Primary Examiner* — Hung Duong
(74) *Attorney, Agent, or Firm* — Altis Law Group, Inc.

(57) ABSTRACT

A tilting portable electronic device includes a housing, a cover, at least one supporting rod and at least one telescoping bar. The at least one supporting rod rotatably connects to the housing and the cover; the at least one telescoping bar rotatably connects to the housing and the cover. The telescoping bar includes at least two bushing sections, the two bushing sections retractably connect each other. When the cover is opened relative to the housing, the telescoping bar expands and rotates and the supporting rod rotates until the telescoping bar and the supporting rod cooperatively support one end of the cover.

13 Claims, 6 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| U.S. application Ser. No. | Title | Inventors |
|---|---|---|
| 12/825,459 | TILTING PORTABLE ELECTRONIC DEVICE | Kun-Tsan Wu et al. |
| 12/825,462 | TILTING PORTABLE ELECTRONIC DEVICE | Kun-Tsan Wu et al. |
| 12/825,471 | TILTING PORTABLE ELECTRONIC DEVICE | Kun-Tsan Wu et al. |
| 12/825,474 | TILTING PORTABLE ELECTRONIC DEVICE | Kun-Tsan Wu et al. |
| 12/825,477 | TILTING PORTABLE ELECTRONIC DEVICE | Kun-Tsan Wu et al. |
| 12/825,483 | TILTING PORTABLE ELECTRONIC DEVICE | Kun-Tsan Wu et al. |
| 12/825,484 | TILTING PORTABLE ELECTRONIC DEVICE | Kun-Tsan Wu et al. |
| 12/825,488 | TILTING PORTABLE ELECTRONIC DEVICE | Kun-Tsan Wu et al. |

BACKGROUND

1. Field of the Invention

The present invention relates to tilting portable electronic devices.

2. Description of Related Art

Conventional portable electronic device can be classified in three different classes, bar-type devices, rotating-type devices and sliding-type devices. The bar-type device has a housing secured with a cover. The rotating-type device includes a housing and a cover rotatably attached to the housing about a single axis. The sliding-type device has a housing and a cover slidably attached to the housing.

However, sliding-type electronic devices have the following similar problems. When a user wants to watch a display of the electronic device resting on a table, an additional support is needed for supporting the electronic device in a slanted position to give the display a better viewing angle. Alternatively, the user may grip and slope the electronic device with his hands, however, it may become uncomfortable after a long time viewing.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
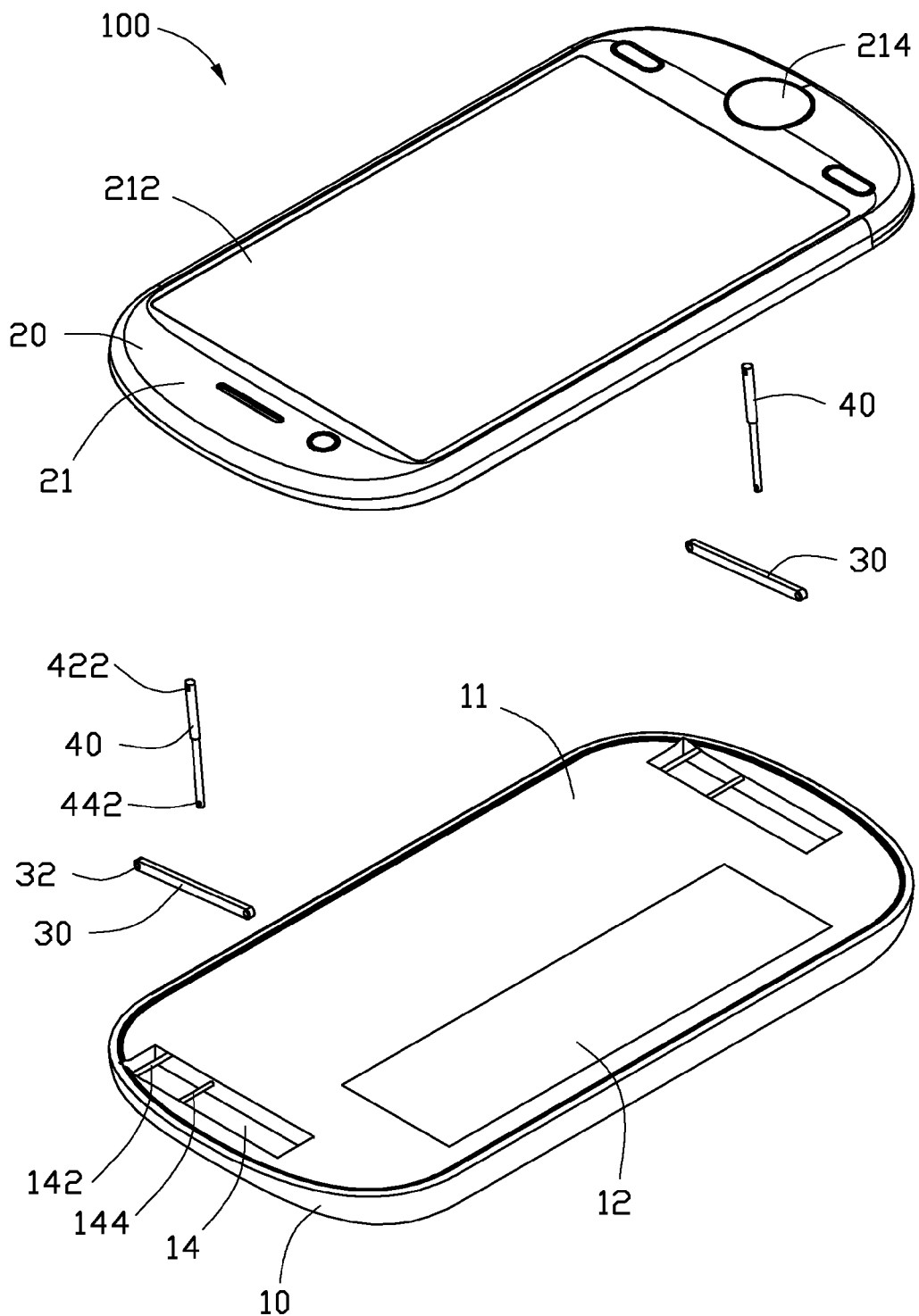
FIG. 1 is an exploded view of a tilting portable electronic device, according to an exemplary embodiment.

FIG. 1 shows a tilting portable electronic device 100, such as mobile phones, or personal digital assistants (PDAs), including a housing 10, a cover 20, two supporting rods 30, and two telescoping bars 40. The cover 20 is slidable relative to the housing 10. The two supporting rods 30 rotatably connect to the housing 10 and the cover 20. The supporting rods 30 and the telescoping bars 40 cooperatively support one end of the cover 20 in a slanted position relative to the housing 10.

The housing 10 has a top surface 11 having a keypad area 12 and two first receiving grooves 14 defined therein. The keypad area 12 is adjacent to one end of the top surface 11 and used to position a keypad therein. The two first receiving grooves 14 are arranged adjacent to opposite sides of the top surface 11 and extend along the sliding direction of the cover 20. Each receiving groove 14 has a first connecting post 142 and a second connecting post 144 assembled therein, the first connecting post 142 and the second connecting post 144 are substantially parallel to each other, and substantially adjacent to one end of the receiving groove 14. The first connecting post 142 is rotatably connected to one end of the supporting rod 30 and the second connecting post 144 is rotatably connected to one end of the telescoping bar 40.

Figure 2:
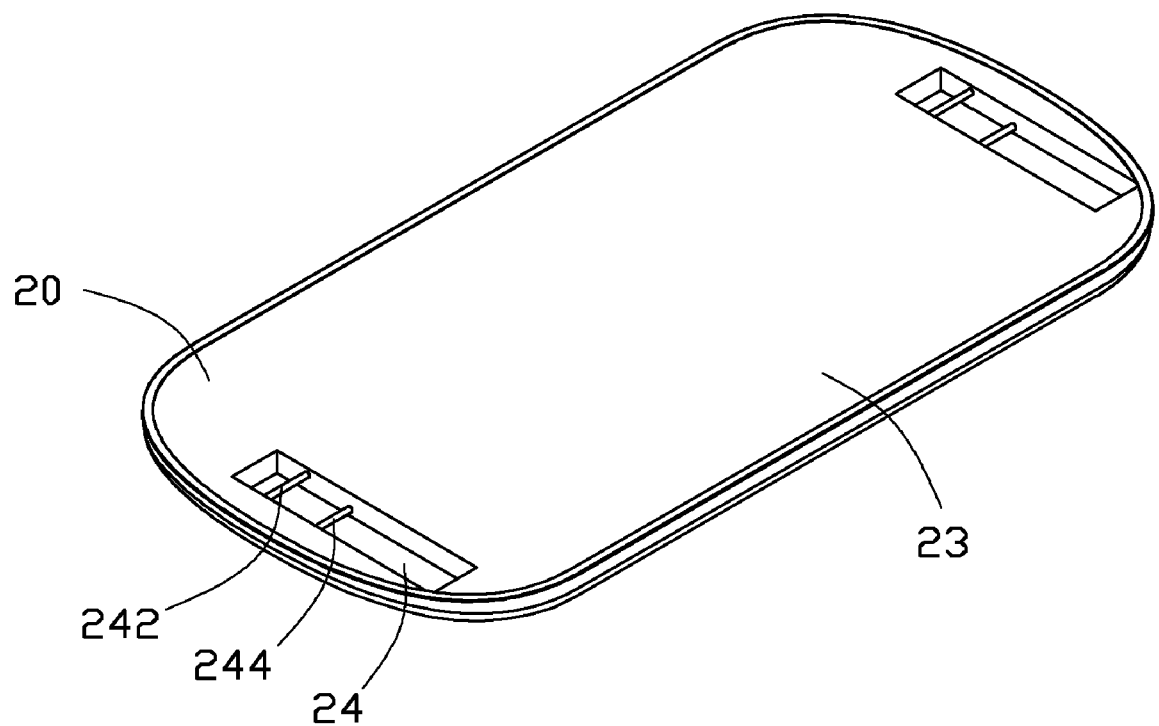
FIG. 2 is an isometric back view of a cover of the electronic device shown in FIG. 1.

Referring further to FIG. 2, the cover 20 has an outer surface 21 and an opposite inner surface 23. The outer surface 21 has a display 212 and a plurality of buttons 214 arranged thereon. The inner surface 23 has two second receiving grooves 24 defined thereon, the two second receiving grooves 24 are arranged adjacent to opposite sides of the inner surface 23 to correspondingly engage with the two first receiving grooves 14. The second receiving groove 24 has a first shaft 242 and a second shaft 244 assembled therein, the shaft 242 and 244 are substantially parallel to each other and substantially adjacent to one end of the second receiving groove 24 opposite to the connecting post 142 and 144 after the cover 20 is assembled. The first shaft 242 is rotatably connected to one end of the supporting rod 30 and the second shaft 244 is rotatably connected to one end of the telescoping bar 40.

The supporting rod 30 defines a connecting hole 32 at each end. The two connecting holes 32 receive the first connecting post 142 and the first shaft 242 respectively.

Figure 3:
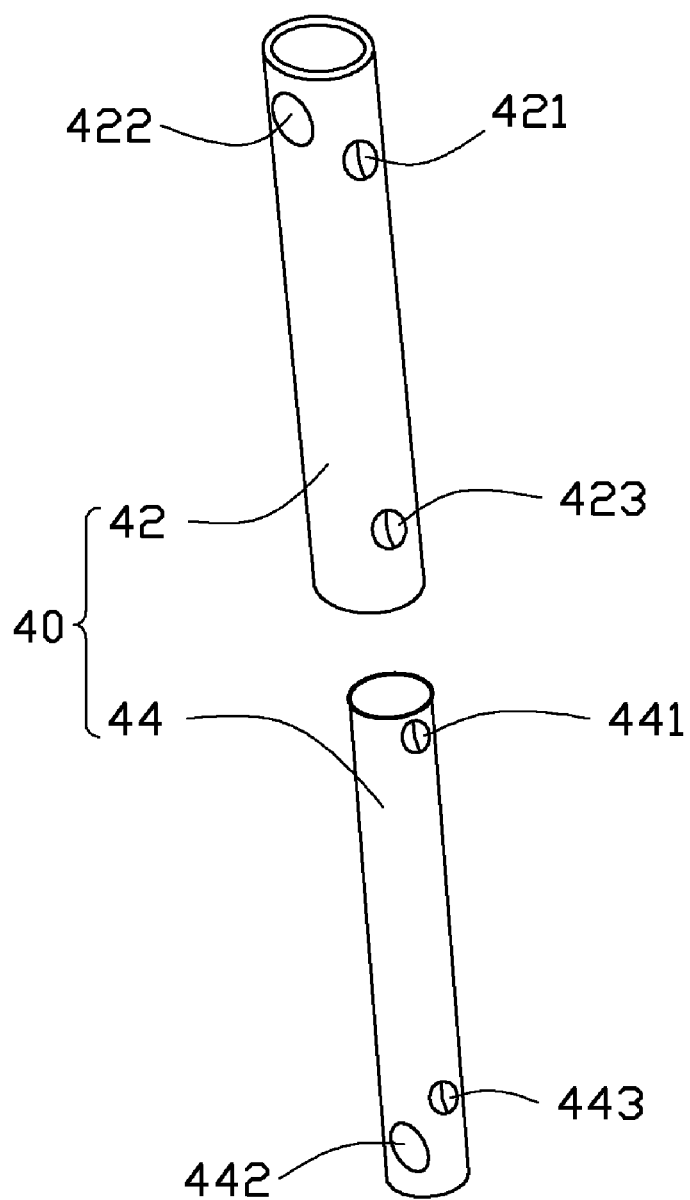
FIG. 3 is an exploded view of a telescoping bar of the electronic device shown in FIG. 1.

Referring to FIG. 3, the telescoping bar 40 can be extended and includes a first bushing section 42 and a second bushing section 44. The first bushing section 42 and the second bushing section 44 are cylindrical and have substantially the same length. The first bushing section 42 has a slightly larger diameter than the second bushing section 44, and the second bushing section 44 can be inserted and received in the first bushing section 42. The first bushing section 42 radially defines a first linking hole 422 substantially adjacent to one end to engage with the second shaft 244 of the cover 20. The second bushing section 44 also radially defines a second linking hole 442 substantially adjacent to one end. The second linking hole 442 is opposite to the first linking hole 422 after the two bushing sections 42 and 44 are connected to each other, the second linking hole 442 is used to engage with the first shaft 242 of the hosing 10. The first bushing section 42 defines a first depression 421 adjacent to one end, a second depression 423 adjacent to the opposite other end. The second bushing section 44 defines a third depression 441 adjacent to one end and a fourth depression 443 adjacent to the opposite other end. The depressions 421, 423, 441, and 443 are hemispherical. The depressions 421 and 423 can be elastic and can latch into the depressions 441 and 443.

Figure 4:
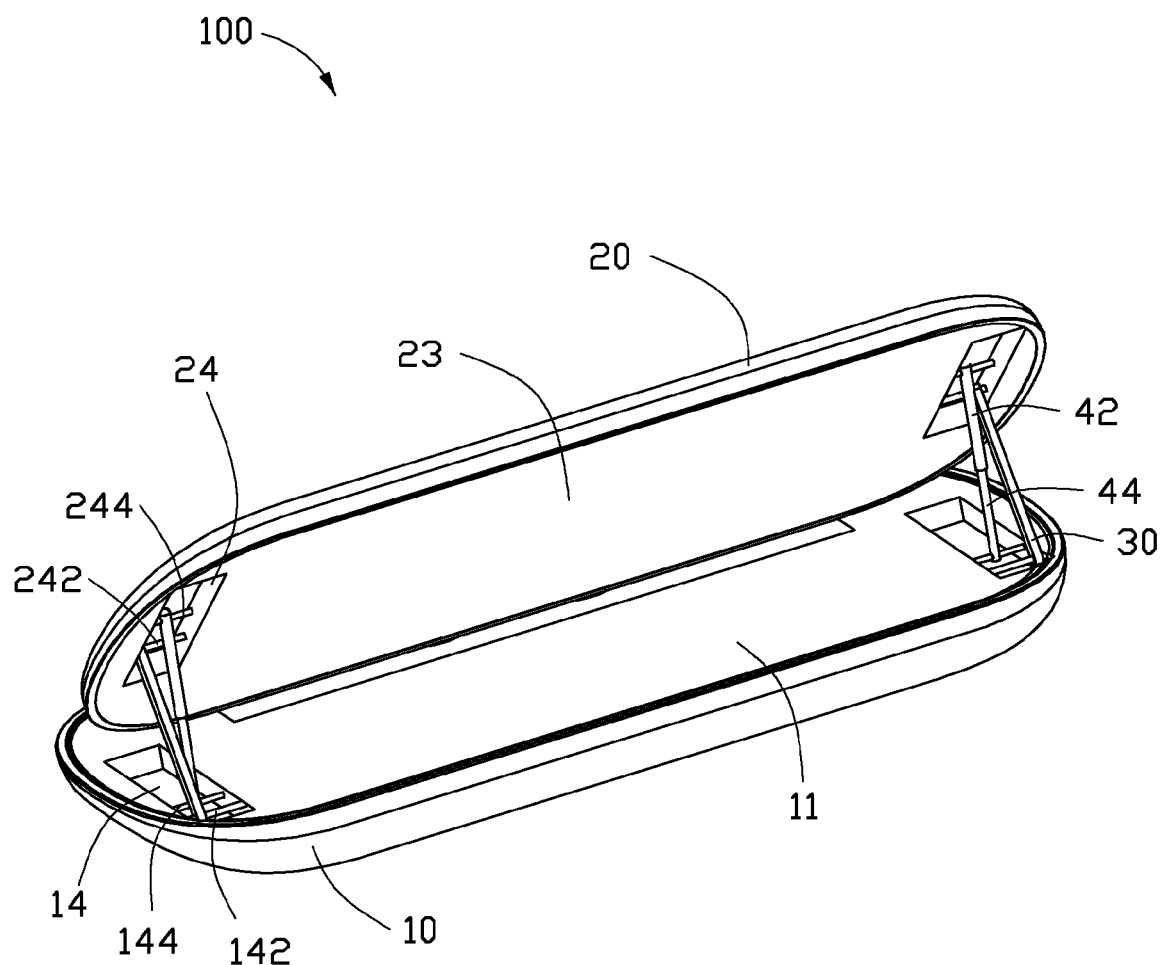
FIG. 4 is an assembled schematic view of the electronic device shown in FIG. 1 with the cover opened relative to a housing.
Figure 5:
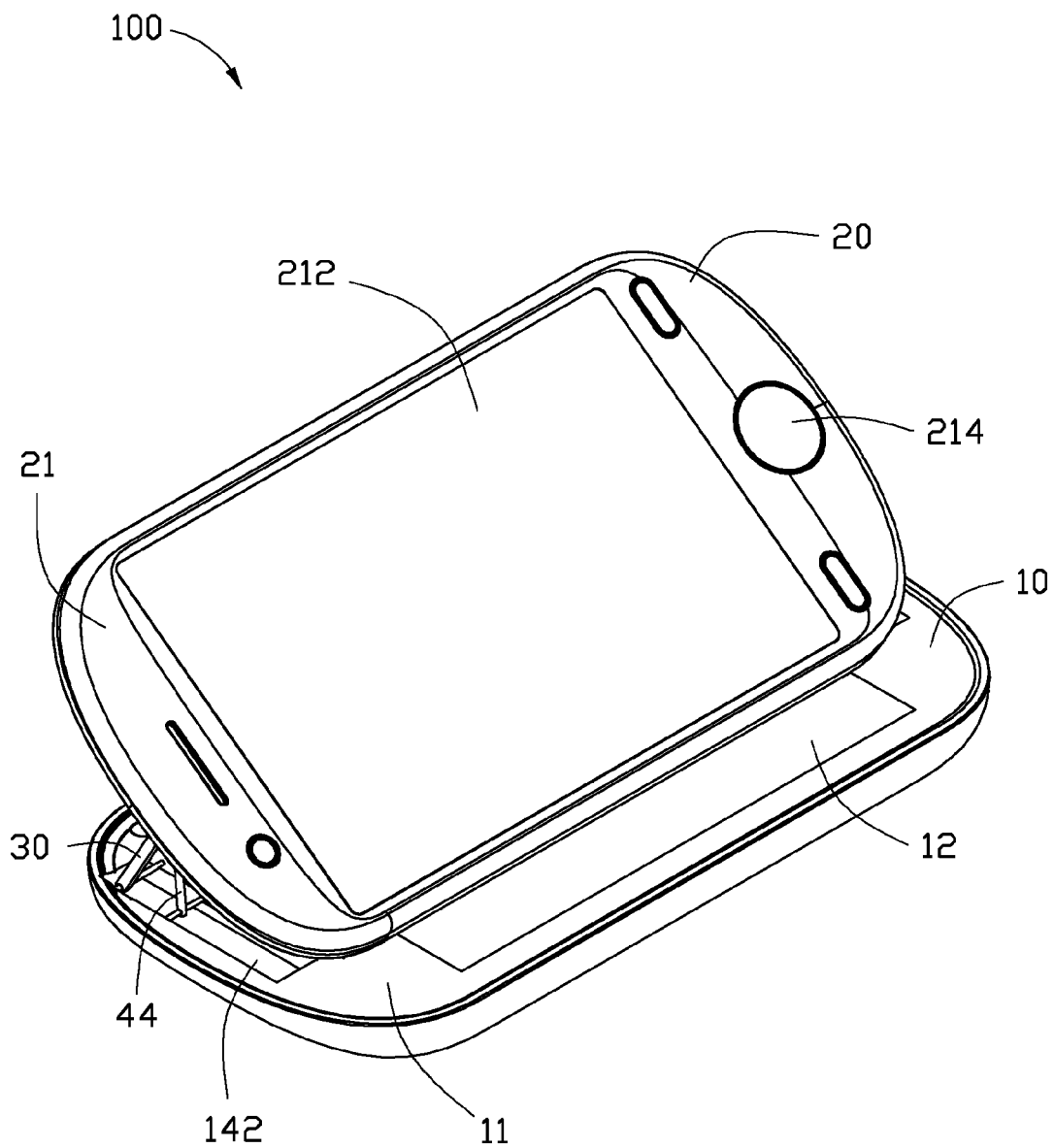
FIG. 5 is an assembled schematic view of the electronic device shown in FIG. 4 from another view.

Referring to FIGS. 4 and 5, to assemble the electronic device 100, firstly, the second bushing section 44 is inserted into the first bushing section 42 to form the telescoping bar 40. The first receiving groove 14 of the housing 10 corresponds to the second receiving groove 24 of the cover 20. Each of the supporting rods 30 is rotatably connected to the first connecting post 142 and the first shaft 242. Each of the telescoping bars 40 is rotatably connected to the second connecting post 144 and the second shaft 244.

After assembly of the electronic device 100, the telescoping bar 40 is expanded and slanted relative to the top surface 11, with the second depression 423 latching into the third depression 441. The supporting bar 30 is slanted relative to the top surface 11. The telescoping bar 40 and the supporting rod 30 are intercrossed to support an end of the cover 20, the other end of the cover 20 abuts on the top surface 11 of the housing 10. the cover 20 is slanted relative to the housing 10 in a predetermined angle.

Figure 6:
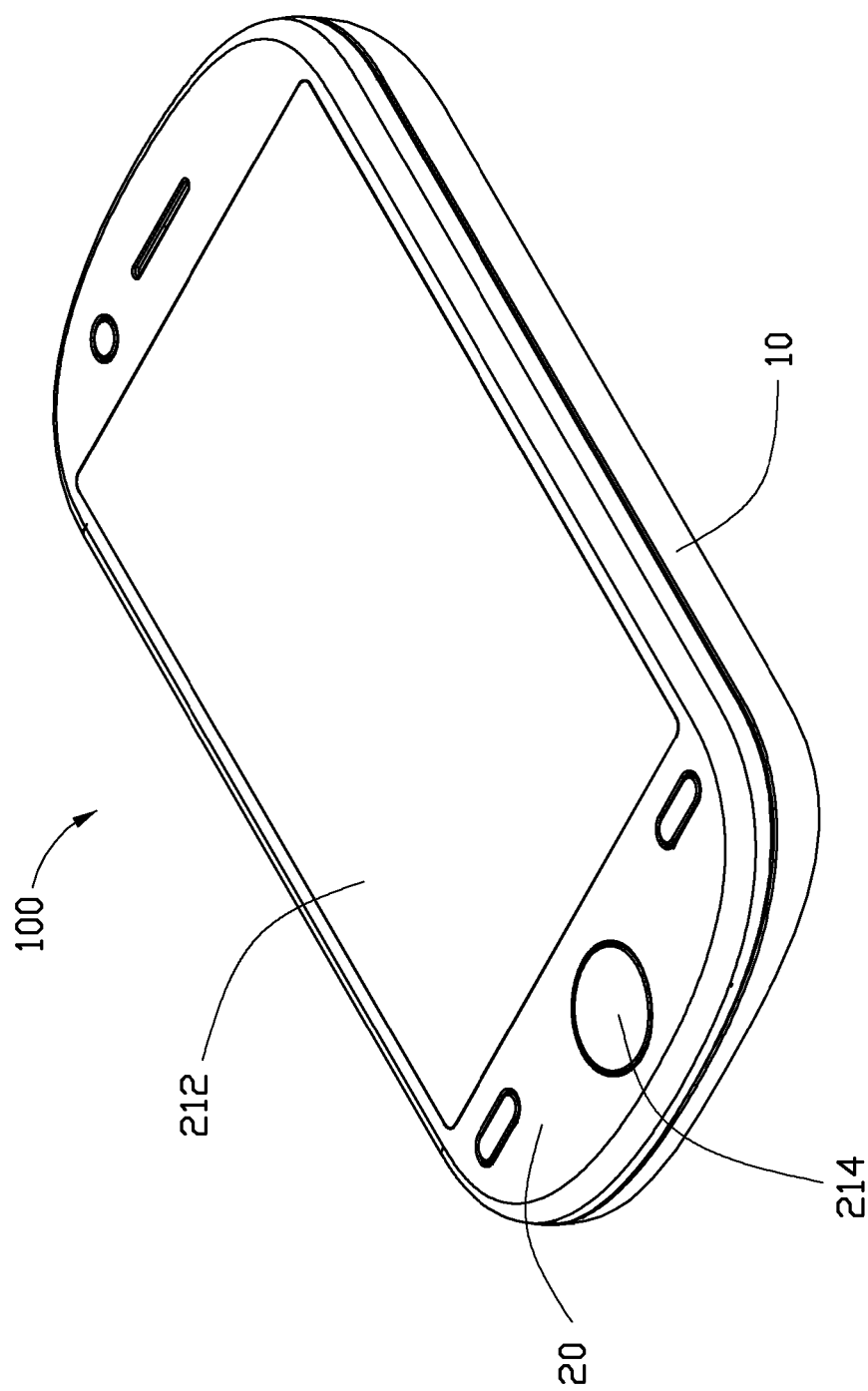
FIG. 6 is an assembled schematic view of the electronic device shown in FIG. 4 with the cover closed.

Referring to FIG. 6, to close the cover 20, the end of cover 20 not abutting the top surface 11 is pressed downwardly, the telescoping bars 40 contract and rotate, the second depression 423 slides out the third depression 441 and slides along the second bushing section 44. The supporting bars 30 rotate accordingly. The other end abutting on the top surface 11 of the cover 20 slides correspondingly to cover the keypad area 12, until the first depression 421 latches to the third depression 441. The second depression 423 latches to the fourth depression 443. Simultaneously, the telescoping bar 40 is shortened. The telescoping bar 40 and the supporting bars 30 are received in a area defined by the first receiving groove 14 and the second receiving groove 24. The cover 20 covers the top surface 11 of the housing 10.

To open the cover 20, the cover 20 is pushed by an external force, the first depression 421 slides out the third depression 441, the telescoping bars 40 expand, simultaneously the telescoping bars 40 and the supporting bars 30 rotate. When the second depression 423 slides into the third depression 441, the telescoping bar 40 extends in a maximum. The telescoping bars 40 and the supporting bars 30 intercross and cooperatively support one end of the cover 20, with the other end of the cover 20 abutting on the top surface 11. The cover 20 is slanted relative to the housing 10 at a predetermined angle, the cover 20 is in an open configuration.

It is noteworthy that, the fourth depression 443 can be omitted, in order to have a plurality of slant positions of the cover 20, the first bushing section 42 can form a plurality of depressions to engage with the depression 441 of the second bushing section 44.

It is noteworthy that, the telescoping bar 40 includes at least two bushing sections, each two of the bushing sections connect retractably.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A tilting portable electronic device, comprising:
   a housing;
   a cover;
   at least one supporting rod rotatably connecting to the housing and the cover; and
   at least one telescoping bar rotatably connecting to the housing and the cover, the telescoping bar including at least two bushing sections, the two bushing sections retractably connecting with each other; wherein:
   when the cover is opened relative to the housing, the telescoping bar expands and causes the supporting rod to rotate until the telescoping bar and the supporting rod intercross to support one end of the cover in a slanted position relative to the housing.

2. The tilting portable electronic device as claimed in claim 1, wherein the housing defines two first receiving grooves, the cover defines two second receiving grooves corresponding to the first receiving grooves; wherein one end of each supporting rod rotatably extends into a respective first receiving groove and the other end of each supporting rod rotatably extends into a respective second receiving groove.

3. The tilting portable electronic device as claimed in claim 2, wherein the first receiving groove has a first connecting post assembled therein, the second receiving groove has a first shaft assembled therein, the supporting rod defines a connecting hole at each end, the connecting holes of the supporting rod rotatably and respectively connect to the first connecting post and the first shaft.

4. The tilting portable electronic device as claimed in claim 3, wherein the first receiving groove has a second connecting post assembled therein, the second receiving groove has a second shaft assembled therein, one end of the telescoping bar rotatably connects with the second connecting post and the other end of the telescoping bar rotatably connects with the second shaft.

5. The tilting portable electronic device as claimed in claim 4, wherein the telescoping bar includes a first bushing section and a second bushing section, the second bushing section slidably connects with and receives in the first bushing section.

6. The tilting portable electronic device as claimed in claim 5, wherein the first bushing section defines a first linking hole adjacent to one end, the first linking hole rotatably connects to the second shaft of the cover, the second bushing section defines a second linking hole adjacent to one end, the second linking hole rotatably connects to the first shaft of the housing.

7. The tilting portable electronic device as claimed in claim 5, wherein the first bushing section defines a depression adjacent to each end, the second bushing section defines a depression adjacent to each end, the depressions of the first bushing sections can respectively latch with each depression of the second bushing section.

8. The tilting portable electronic device as claimed in claim 2, wherein the housing defines a keypad area, the cover has a display, and when the cover is opened, the display slants relative to the keypad area.

9. A tilting portable electronic device, comprising:
   a housing having a top surface, the top surface having a keypad formed thereon;
   a cover having an outer surface and an opposite inner surface, the outer surface forming a display;

at least one supporting rod rotatably connecting with the housing and the cover; and at least one telescoping bar rotatably connecting with the housing and the cover, the telescoping bar including at least two bushing sections, the two bushing sections retractably connecting with each other; wherein:

when the cover is opened relative to the housing, the telescoping bar expands and rotates and the supporting rods rotates correspondingly, until the telescoping bar and the supporting rod cooperatively support one end of the cover, causing the display to slanted relative to the keypad.

10. The tilting portable electronic device as claimed in claim 9, wherein the top surface has two first receiving grooves defined thereon, the inner surface has two second receiving grooves defined thereon, wherein one end of each supporting rod rotatably extends into a respective first receiving groove and the other end of each supporting rod rotatably extends into a respective second receiving groove.

11. The tilting portable electronic device as claimed in claim 10, wherein the first receiving groove has a first connecting post and a second connecting post assembled therein, the second receiving groove has a first shaft and a second shaft assembled therein, each supporting rod rotatably connects the first connecting post and the first shaft, the two ends of each telescoping bar rotatably connects the second connecting post and the second shaft.

12. The tilting portable electronic device as claimed in claim 11, wherein the telescoping bar includes a first bushing section and a second bushing section, the second bushing section slidably connects with and receives in the first bushing section.

13. The tilting portable electronic device as claimed in claim 12, wherein the first bushing section defines a depression adjacent to each end, the second bushing section defines a depression latchably with each depression of the first bushing section.

* * * * *